INVENTOR.
THOMAS W. ALBERTS
BY
ATTORNEY

April 6, 1965  T. W. ALBERTS  3,177,080
MEAT PROCESSING
Filed Sept. 15, 1961  3 Sheets-Sheet 3

INVENTOR.
THOMAS W. ALBERTS
BY *Dallett Hoopes*

ATTORNEY

United States Patent Office 3,177,080
Patented Apr. 6, 1965

3,177,080
MEAT PROCESSING
Thomas W. Alberts, Philadelphia, Pa., assignor to Pennsalt Chemicals Corporation, a corporation of Pennsylvania
Filed Sept. 15, 1961, Ser. No. 138,304
2 Claims. (Cl. 99—108)

This invention relates to processing meat. More specifically this invention relates to the production of a partially defatted chopped meat having a controlled fat content irrespective of the fat content of the primal cuts used as raw material for the process.

The invention deals primarily with the separation of fat from meat without raising the temperature of the meat sufficiently to coagulate the protein therein. The meat, therefore, though partly defatted remains "uncooked," and because it can be used in either cooked or uncooked products its usefulness and saleability are unimpaired.

In the manufacture of composite meat products including, for instance, sausage and various canned ham products, the quality of the final commodity is controlled to a large extent by the quality of the ingredients as well as the ratio of their presence. For instance, in the production of frankfurters, the quality of sausage emulsion has much influence on the texture, taste and appearance of the product. In turn, the quality of the sausage emulsion will depend on the quality of the raw materials and their processing. Especially influencing is the fat content or level of the sausage emulsion. While for each sausage product maximum fat content is established by law, many producers prefer to reduce the fat content below the allowable maximum to produce a commodity having more desirable characteristics. At the same time economic pressures on the meat processor demand that the fat content be above a certain lower limit. In any case, each processor requires a substantially constant fat content in his various products. Hence there is requirement for means by which the fat level of the sausage emulsion, for instance, can be accurately predetermined and controlled.

Moreover, additional demand for means by which the fat level of an ingredient may be controlled and predetermined stems from the varying fat level requirements from product to product. For instance, the fat content of the sausage emulsion used in making frankfurters may range between 19 and 36%, while for other sausage emulsion products fat contents as high as 50% are permissible. Hence as the producer switches in production from one product to another as he frequently may, control of the fat level in the emulsion is essential.

In the past uniformity of the fat content and control thereover has been left to the hit-or-miss type performance of a manual worker called a "trimmer" who, receiving assorted primal cuts taken from the carcass, carefully trims from the cuts and diverts to a separate rendering operation fatty portions which would be in his estimation cause the chopped meat product to exceed the desired fat content. The primal cuts have been 20% to 85% fat. The amount of fat to be trimmed off the primal cuts has demanded considerable judgment on the part of the trimmer as it has depended on the condition and size of the animal, the type of animal, and other factors. After trimming the cut, the trimmer has introduced the cut to the process. The fat level content of the process product has periodically been checked, for instance, daily, to determine the performance of the trimmer. But for the most part the processor has depended solely on the unchecked discretion of this manual worker for the quality of the product. Because he has become a key figure in the packing plant, the trimmer has demanded and received a wage perhaps double the wage of the average packing house worker.

In the presently pending application of Francis P. Downing, Serial No. 5,393, filed January 29, 1960, now Patent No. 3,078,287, issued on February 19, 1963, there is described a process for fat rendering in which raw fat is ground, heated to a temperature between 90° and 110° F., comminuted to uniformly raise its temperature an additional 5° to 10° F. and is introduced to a centrifuge. In the centrifuge the protein solids and melted fat are to an extent separated and separately discharge. The melted fat is additionally processed. While the present invention deals with the processing of meat as opposed to fat tissue, some of its steps are to some degree comparable to those of the Downing process, and this invention may be regarded as an improvement thereover.

It is, therefore, an object of this invention to provide a process by which meat may without being cooked be partially denuded of its fat content to present a chopped meat of accurately controlled fat content.

It is a further object of this invention to provide an apparatus by which the separation of melted fat from meat may be controlled to provide a product having predetermined and uniform fat content.

Other objects and features of the invention will be understood from reference to the following specification including the accompanying drawings in which.

Briefly, in a process for producing a partly defatted chopped meat product, the invention involves the steps of heating and comminuting meat to bring it to a temperature in the range of about 100° F. to about 120° F. at which temperature a portion of the fat in the meat has melted; introducing the heated and comminuted meat along with its melted fat to a zone of centrifugation of controllable separating effectiveness; permitting separate discharge from the zone of substantially separated melted fat and centrifuged meat containing some fat; measuring the fat content of the centrifuged meat; and controlling the separating effectiveness of the zone to maintain the fat content of the centrifuged meat within desired limits.

Figure 1:
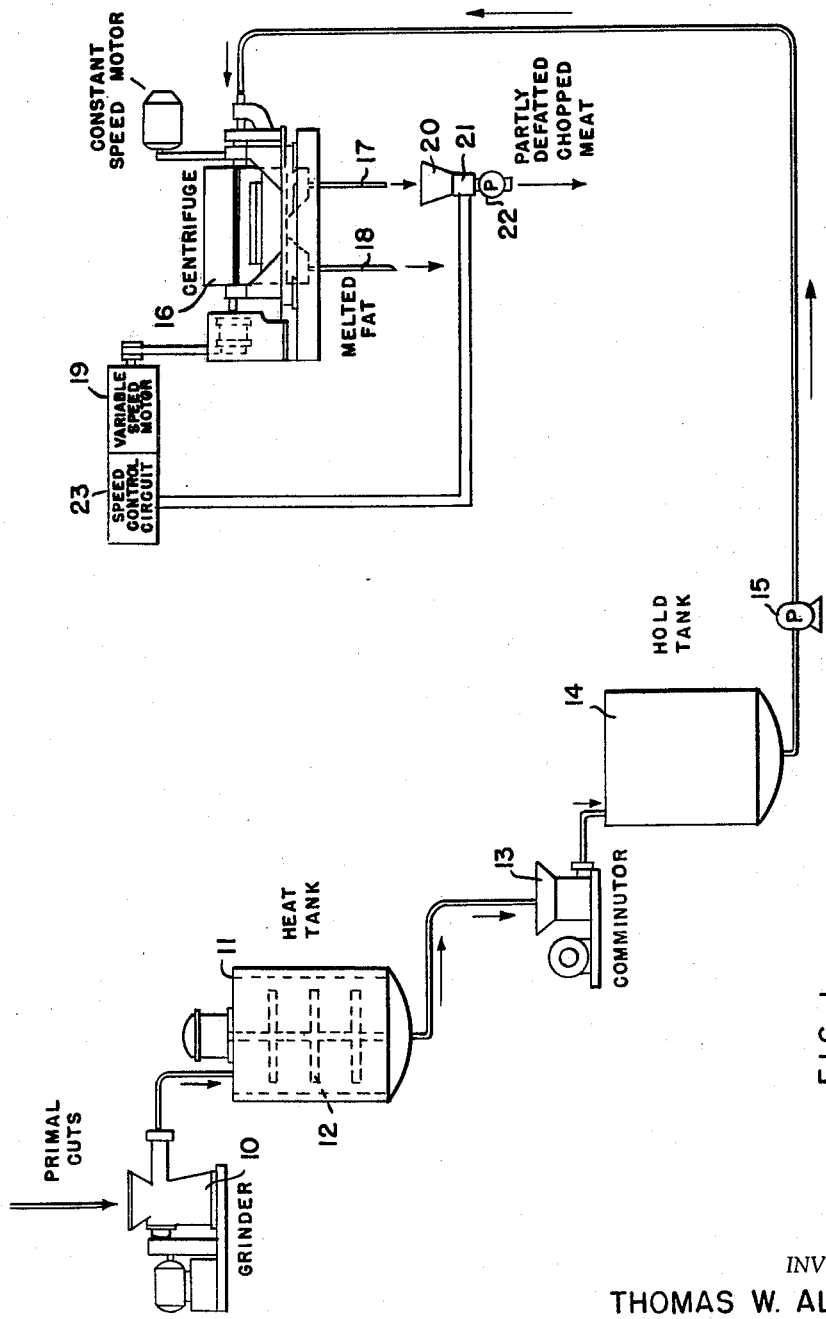
FIGURE 1 is a flow sheet diagrammatically illustrating the new process.

Referring to the drawings, FIGURE 1 illustrates a typical flow diagram for the process and indicates that primal cuts are introduced to a grinder to commence the processing. The word "primal" as used herein indicates original or first and designates those cuts taken from the carcass of the animal and fed in whole untrimmed state into the process. Distinguished therefrom are the trimmed cuts or trimmed primal cuts delivered by a trimmer into a chopped meat process of the prior art.

The grinder, designated 10, may be any device for grinding the meat at any desired temperature substantially below protein coagulating temperatures, that is, whether chilled, warm, or at room temperature. Preferably the grinding or other comminuting is such that the average particle size is below ¾", such as between ⅟₃₂" and ¾". The ground meat is delivered to the tank 11 provided with an agitator indicated at 12. The tank 11 is also provided with means for temperature control of the meat. Any desired means may be employed for the purpose, and indirect temperature control of the meat in the tank 11 is preferred, such as by the use of a heating coil or a jacket into which steam or hot water may be introduced to bring the meat to, or to hold the meat at, the desired temperature. The agitator 12 assists in obtaining and maintaining a degree of uniformity of temperature throughout the meat in the tank 11.

As indicated above the raw meat ground by the grinder 10 flows to tank 11, with its protein in uncoagulated condition, and is brought therein to a temperature sufficiently high to melt some of the fats therein. This temperature rarely exceeds 115° F., 95° to 115° F. being an excellent range.

The meat together with the melted fat under the temperature conditions indicated flows as a fluid from tank 11 to the comminutor or mincer 13. The comminutor further reduces the particle size of the meat and introduces mechanical energy thereinto to quickly raise its temperature additionally (for instance 3° to 10°) sufficiently high (at least above 100° F.) to melt a large additional portion of the fat. The thus raised temperature will not exceed 120° F. or the coagulating temperature of the protein whichever is higher. Raising the temperature of the tissue by conversion of mechanical energy into heat in manipulation of the tissue provides an excellent means for the direct introduction of heat intimately and rapidly throughout the entire mass of tissue under conditions readily affording close control of the temperature.

From the comminutor or mincer 13 the pink paste-like fluid is preferably conducted to a holding vat or tank 14 whereby a sufficient quantity in reservoir for continuous operation of the subsequent processing steps is assured despite irregularities in the flow of tissue at earlier stages in the process.

From the holding tank 14 a positive displacement pump 15 may be used to drive the tissue together with melted fat to the centrifuge 16.

Centrifuge 16 is of the continuous solids discharge type wherein, in the practice of the invention, the major part of the solids, for instance, between 75 and 95% is removed in relatively dry condition from the rest of the mass and discharged as indicated at 17. The liquid effluent separated in the centrifufie 16 which contains the fat, emulsion, water and the rest of the solids is delivered therefrom at 18 and may be further processed in accordance with the above-mentioned pending applicattion.

Figure 2:
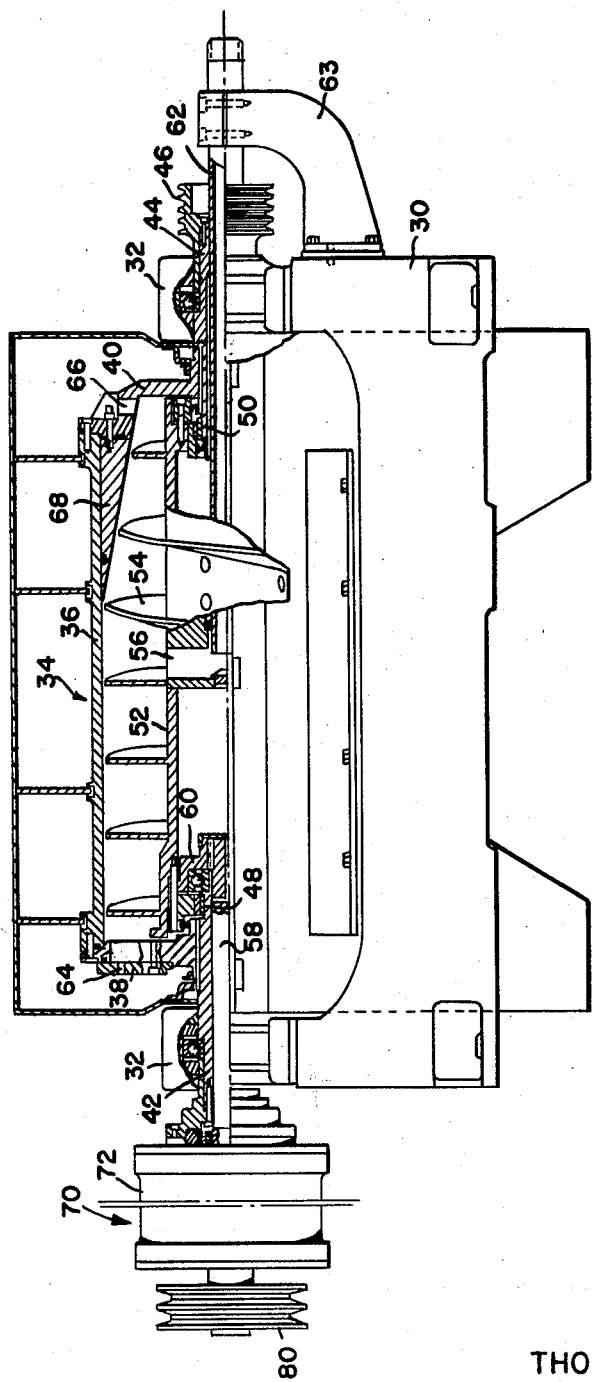
FIGURE 2 is a sectional view of a centrifuge useful in carrying out the process.

A suitable centrifuge for performing the operation of centrifuge 16 is illustrated in FIGURE 2.

As shown the machine comprises a frame 30 including a pair of spaced aligned bearing units 32. A rotor 34 comprises a peripheral wall 36 and a pair of spaced end walls 38 and 40 secured thereto. The end walls 38 and 40 are integrally formed with outwardly extending coaxial shafts 42 and 44, respectively, each of which are formed with axial openings. The shafts 42 and 44 are mounted to rotate within the bearing units 32, and the shaft 44 has a rightward extension as shown in FIGURE 2 terminating in a pulley assembly 46. As shown in FIGURE 1 a constant speed motor is connected thereto. The end walls 38 and 40 carry inwardly projecting stubs 48 and 50.

Rotatably mounted between and on the stubs 48 and 50 is a conveyor element 52 having helical flights 54 and a feed opening 56 intermediate its ends. A drive shaft 58 extends axially within the opening of shaft 42, is adapted to rotate at a speed different from the speed of shaft 42, and is secured for unitary movement with the conveyor element 52 by being keyed to the conveyor hub element 60.

As shown in FIGURE 2 an axial feed tube 62 supported by a rightwardly extending arm 63 is adapted to lead a feed mixture to a central position of the apparatus wherefrom it is passed through the feed opening 56 into the rotor. Appropriate seals, not a part of this invention, are provided between the feed tube 62 and the conveyor element 52 to keep the feed from entering the various bearing units.

The leftward end wall as shown in FIGURE 2 is formed with a liquid discharge opening 64 spaced inwardly from the outermost inside surface of the peripheral wall 36.

Similarly, the rightward end wall 40 is formed with a solids discharge opening 66, preferably as shown extending radially of the axis. The inward terminus of the opening 66 is disposed inwardly of opening 64.

As shown, the conveyor element 52 has its flights reduced in radius toward the right end of the apparatus to conform to a frusto-conical shape, and a bowl filler 68 is provided to streamline the transition between the inside surface of the wall 36 and opening 66 in order that solids may be easily plowed toward the latter.

Figure 3:
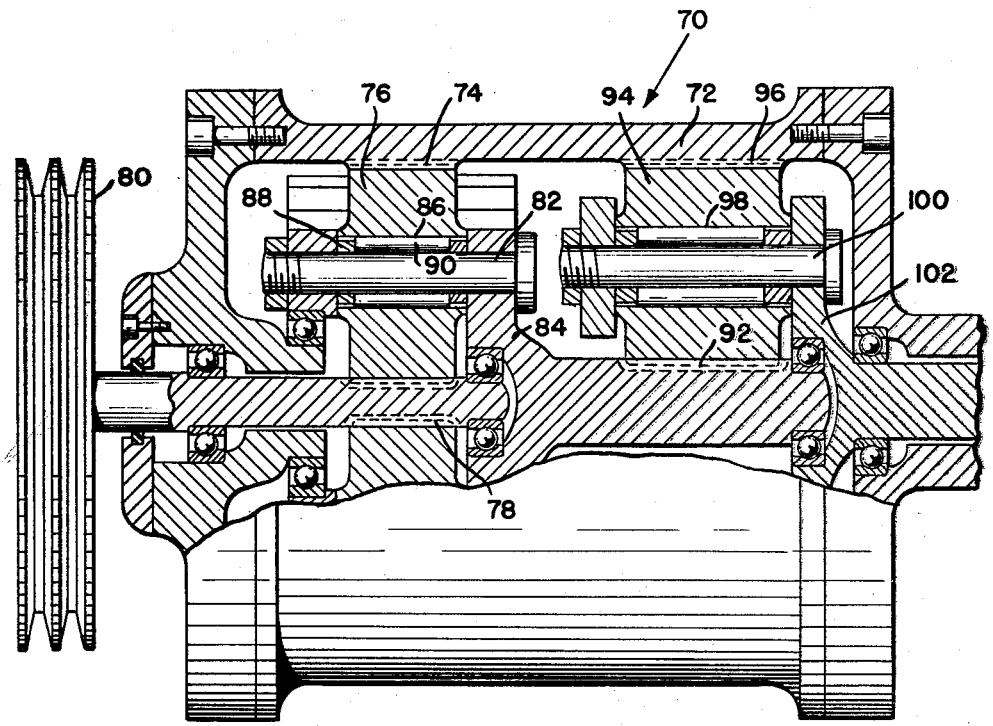
FIGURE 3 is an enlarged sectional view of a portion of the drive mechanism of the centrifuge.

By means of the gear box 70 the rotational movement of rotor 34 is imparted to the conveyor element 52. As shown in FIGURE 3 the gear box 70 has its casing 72 connected to shaft 42 (FIG. 2). Within this casing 72 is an internal gear 74 which meshes with a plurality of planet gears 76. In turn the planet gears mesh with and rotate about the pinion 78 which is coaxial with the casing 72 and the rotation of which is effected by the pulley 80 as will be hereinafter described. The planet gears are carried on the journals 82 which may be part of or rigidly attached to a supporting spider 84.

Rotation of the planet gears 76 is around the bearings 86 having cages 88 and rollers 90 and fitting over the journals or shafts 82. Each journal or shaft 82 serves as an inner race for its respective bearing. The journals or shafts 82 may roatate with the spider 84 about the central axis of the gear box. A central pinion 92 integral with the spider 84 meshes with a second series of planet gears 94. In turn these planet gears mesh with a second integral gear 96 within the gear box casing 72. The planet gears 94 are carried by bearings 98 which may be of the same form as the bearings 86. These bearings rotate on journals or shafts 100 which are attached to or may be integral with the spider 102.

Extending from the spider 102 is the shaft 58 which as previously mentioned, drives the conveyor element 52 within the rotor 34. Rotation of the gear box 70 causes the planet gears 94 to revolve around the inside of the internal gear 96 carrying the journals 100 with them and thus rotating the spider 102 and the shaft 58. As a result, in the absence of rotation of the pinion 78, the shaft 58 is driven at a speed differing from that of the casing 72 by the ratio provided in the gearing. In the present apparatus, however, the pinion 78 is driven through the pulley 80 by the variable speed motor 19 (FIGURE 1). It will be understood that while the speed of rotation of the rotor 34 will remain constant, the speed of rotation of the conveyor element 52 may be altered by varying the speed of the pinion 78.

The purpose of altering the relative speeds of rotation of the rotor 34 and the conveyor element 52 will be explained with reference once again to FIGURE 2. It will be apparent that the duration of the residence of the meat in the rotor 34 will depend upon the speed with which it is conveyed by the conveyor element 52 toward the solids discharge opening 66. Since in the apparatus of FIGURE 2 the rotor 34 and the conveyor element 52 rotate in the same direction (clockwise when viewed from the rightward end) but at different speeds, the solids may be plowed rightward toward the opening 66 more rapidly by increasing the speed of the element 52 relative to the bowl. The latter may be accomplished by changing the speed of the pinion 78.

Means for providing a variable speed of rotation to the pinion 78 may be the variable speed motor 19. A motor suitable for use as motor 19 is an "Allispede" motor providing mechanical adjustable speed drive controllable by means of a manually adjustable handwheel. One such model offers shaft output speed controllable from 390 to 1170 r.p.m.

Alternatively, the speed of the pinion 78 may be altered by the provision of a constant speed motor as motor 19 and by changing the radii of the pulley on the motor 19 and the pulley 80.

The preferred control, however, provides automatic rather than manual speed regulation of pinion 78. As shown in FIGURE 1 the partly defatted chopped meat or solids discharged from the centrifuge 16 fall into the receiver 20. From receiver 20 the fluid solids pass into the transition piece 21 including a measuring cell. From thence the solids pass, urged conveniently by a pump 22, to a point for further processing if required or desired.

The cell in the transition piece 21 is conventional and comprises a pair of parallel spaced electrodes 110 (FIGURE 4) extending transversely into the fluid flow. From the electrodes, respectively, leads extend in the speed control circuit 23 to the reversing relay 112. The relay 112 of conventional circuit and manufacture is such that, provided with a polarized source of current 114 as shown it will pass a current through the connected winding 116 of direction and intensity depending on the resistance measured across the probes 110. In the present application the winding 116 is the field winding in the master servo 118 of a pair of servos. The slave servo 118a has its shaft connected directly or through appropriate gearing to the control shaft of a variable speed motor such as specified above.

A drop or increase in the conductivity of the fluid between probes 110 will, through the circuit disclosed, result in an increase or decrease in the speed of the motor 19 as desired.

Figure 4:
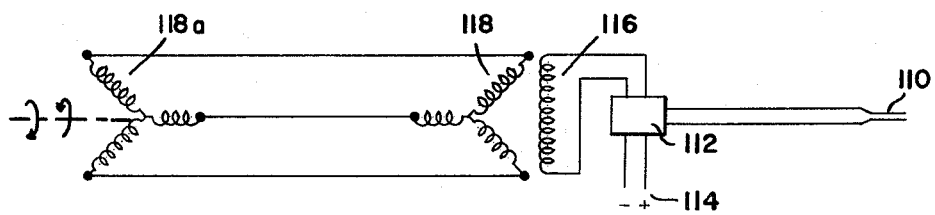
FIGURE 4 is a schematic diagram illustrating a speed control circuit suitable for use in accordance with the process and the apparatus embodying the invention.

It should be understood that circuits other than that disclosed in FIGURE 4 may be substituted therefor if desired for any reason. Electronic circuits and devices employing semiconductors may be used, for instance.

I have discovered that the conductance of the fluid between the spaced electrodes 110 will give an accurate measure of the moisture content of the fluid. The moisture content is directly proportional in the ratio of approximately 4 to 1 to the protein content of the centrifuged meat. In turn the protein content gives accurate inverse indication of the fat level content of the fluid. Hence the conductivity of the fluid across the spaced electrodes is proportional to the fat level content of the fluid.

Referring once again to FIGURES 1 and 2 it will be seen that in operation should the fat level of the centrifuged meat discharging through the opening 66 and into the transition piece 21 increase in conductivity indicating increased moisture, and hence decreased fat content, the cell in piece 21 will report to the control circuit 23 the increase in conductivity and through the circuit there will be an appropriate adjustment in the speed of the motor 19.

The change in speed will, acting through the gear box 70, produce an increase in the speed of the conveyor element 52 relative to the bowl diminishing the residence time of the mixture in the rotor 34 and causing the solids discharge subsequently passing through the opening 66 to have an increased fat content above those of the solids before adjustment. The increased fat level will result in a decrease in the moisture content of the solids discharge and hence a decrease in conductivity which may cause readjustment of the motor speed through the circuit 23.

Hence by the use of the centrifuge 16 having the variable speed motor 19 driving the pinion 78 controlled by the circuit 23 through the cell in piece 21, there is continuous control of the fat level content of the partly defatted chopped meat coming from the process. It will be understood from reference again to FIGURE 4 that the fat level content of the discharged solids may be changed as desired by adjustment of the reversing relay 112.

The following examples are illustrative of the effectiveness of my development.

*Example 1*

Into the grinder 10 equipped with a ¼" plate, were introduced 22,000 pounds of primal cuts consisting of 45% loin cuts, 30% shoulder cuts and 25% jowls. The ground cuts discharged into a jacketed tank equipped with an agitator which rotated the mass at approximately 60 r.p.m. When, through the introduction of hot water into the jacket, the mass reached a temperature of 100° to 110° F. it was transferred by means of a positive displacement pump to a Mincemaster type comminutor. The Mincemaster was equipped with a plate having 8 millimeter diameter openings. In passing through the Mincemaster the mass increased in temperature by reason of the conversion of mechanical energy into heat by 3° to 5° F.

From the Mincemaster the fluid comprising meat tissue and melted fat discharged into a holding tank from which it was pumped by means of a positive displacement pump into a centrifuge of the type shown in FIGURE 2. The centrifuge, equipped with a variable speed motor as motor 19 driving its pinion 78 enabled the operator to control the speed of the element 52 without influencing the speed of the rotor 34 whereby the residence time of the fluid in the rotor 34 could be controlled.

The first sample of the meat tissue was obtained with the speed of the motor 19 set to give a conveyor differential of 16 r.p.m. In other words, the speed of rotation of the element 52 was 16 r.p.m. slower than the speed of rotor 34. A sample discharging at 17 analyzed at 42% fat content, an excessive amount for the particular sausage emulsion being produced.

To adjust the fat content downward the speed of the motor 19 was altered reducing the conveyor differential to approximately 11 r.p.m. Subsequently a sample discharging at 17 analyzed to the desired level of 35%. Subsequent analyses on meat tissue discharging at 17 with the speed of the motor 19 unchanged showed fat contents ranging from 34% to 37% all of which were within the desirable tolerance for the product produced.

The meat tissue recovered amounted to 9673 pounds or 44% of the total feed.

*Example 2*

Into the grinder 10 of the same type used in Example 1 were fed 12,780 pounds of primal cuts consisting of 56% loin cuts, 34% shoulder cuts and 10% jowls. The jacketed tank, Mincemaster, holding tank, and pumps were as used in Example 1.

The first sample of meat tissue was obtained at a setting to give a differential of 11 r.p.m. The sample discharging at 17 analyzed 36% fat level content, in excess for the product produced under this example. The conveyor differential was reduced externally to 8 r.p.m. to adjust the fat content of the meat tissue to the desired level of 30%. The balance of the material was processed under these conditions and subsequent analyses on the meat tissue showed fat contents of 29% and 32% which were within the desired tolerance for the product produced.

The meat tissue recovered amounted to 51.14 pounds or 40% of the total feed.

It will be noted that in the above examples adjustment of the speed of the motor 19 achieved manually and not continuously. It will similarly be understood that in using the automatic control refinement of FIGURES 1 and 4 the fat content of the partly defatted chopped meat from the process may be continuously measured and the speed of the motor 19 continuously controlled. Hence under the refinement extremely close control of the fat level of the product may be achieved. Tolerance within ½ of 1% is achievable.

While the invention has been conceived and perfected in connection with the processing of pork, it should be understood that it is applicable to other meats including, for instance, beef and lamb.

This disclosure has emphasized the processing of fatty meat which may be defined as tissue only 20% to 85% fat, the remainder protein and water. While the process may be used with some effectiveness in control of the fat content of products developed from adipoise tissue, the preferred application of the process is on meat tissue having initial fat content within the limits mentioned above.

It should also be understood that the process as described is useful to control the fat level of meat or fat tissue processed at higher temperatures, e.g., up to 210° F., and more particularly up to 180° F. or 185° F., that is, after the protein has been coagulated; but for the reasons brought out above, its applicability to processing uncoagulated meat is outstanding.

Alterations in the nature of the centrifuge 16 from for instance the cylindrical bowl 34 to a conical bowl are considered reasonable variations of the present invention.

It is therefore to be understood that the above particular description is by way of illustration, and that changes, omissions, additions, substitutions and/or other modifications may be made without departing from the spirit of the invention. Therefore, it is intended that the patent shall cover, by suitable expression in the claims, the various features of patentable novelty that reside in the invention.

I claim:

1. In a process for producing a partially defatted chopped meat product, the steps of grinding a mass of meat to a particle size not exceeding ¾", heating and comminuting the ground mass to bring it to a temperature in the range of about 100° F. to about 120° F. at which temperature a portion of the fat in the meat has melted, introducing the heated and comminuted meat along with its melted fat to a zone of centrifugation bounded by a rotating peripheral surface, said zone having a liquid discharge opening spaced inward from the greatest radius of the surface and a solids discharge opening spaced from the liquid discharge opening and closer to the axis than the liquid discharge opening, continuously discharging substantially separated melted fat through said liquid discharge opening, said peripheral surface enclosing a driving surface adapted to drive the meat at least partially separated from the fat toward the solids discharge opening, discharging the partially separated meat through said solids discharge opening, measuring the fat content of the solids discharge, and controlling the speed of the driving surface relative to the peripheral surface to control residence time of solids in the zone and thereby to maintain the fat content of the solids discharge consisting of the meat product within desired limits.

2. In a process for producing a partially defatted chopped meat, the steps of grinding a mass of meat to particle size not exceeding ¾", heating the ground meat to a temperature within a range of about 95° F. to about 115° F., feeding the heated meat to a zone of comminution wherein the meat is comminuted to a pink homogeneous fluid of pasty consistency, feeding the fluid in a continuous stream to a zone of centrifugation defined by a rotating peripheral surface, said zone having a liquid discharge opening at one end spaced inward from the greatest radius of the surface and a solids discharge opening at the opposite end and closer to the axis than said other opening, said zone having a driving surface adapted to drive solids toward the solids discharge opening, continuously discharging substantially separated melted fat from said liquid discharge opening, continuously discharging solids through said solids discharge opening, continuously measuring a characteristic of the solids discharge which is indicative of the fat content therein, and controlling the relative speed of the driving surface and the peripheral surface to control residence time of the solids in the zone of centrifugation and thereby to maintain the fat content of the solids discharge consisting of the chopped meat within desired limits.

References Cited by the Examiner

UNITED STATES PATENTS

| | | | |
|---|---|---|---|
| 1,766,033 | 6/30 | Meakin | 23—280 |
| 2,551,042 | 5/51 | Nyrop | 23—280 |
| 2,745,856 | 5/56 | Dayen et al. | 260—412.6 |
| 2,823,215 | 2/58 | Downing | 260—412.6 |
| 3,008,831 | 11/61 | Christianson | 99—109 |
| 3,050,399 | 8/62 | Kielsmeier et al. | 99—109 |
| 3,063,840 | 11/62 | Sullivan | 99—18 |
| 3,078,165 | 2/63 | Alberts | 99—18 |
| 3,078,287 | 2/63 | Downing | 99—109 X |

A. LOUIS MONACELL, *Primary Examiner.*
HYMAN LORD, *Examiner.*